Patented Mar. 28, 1933

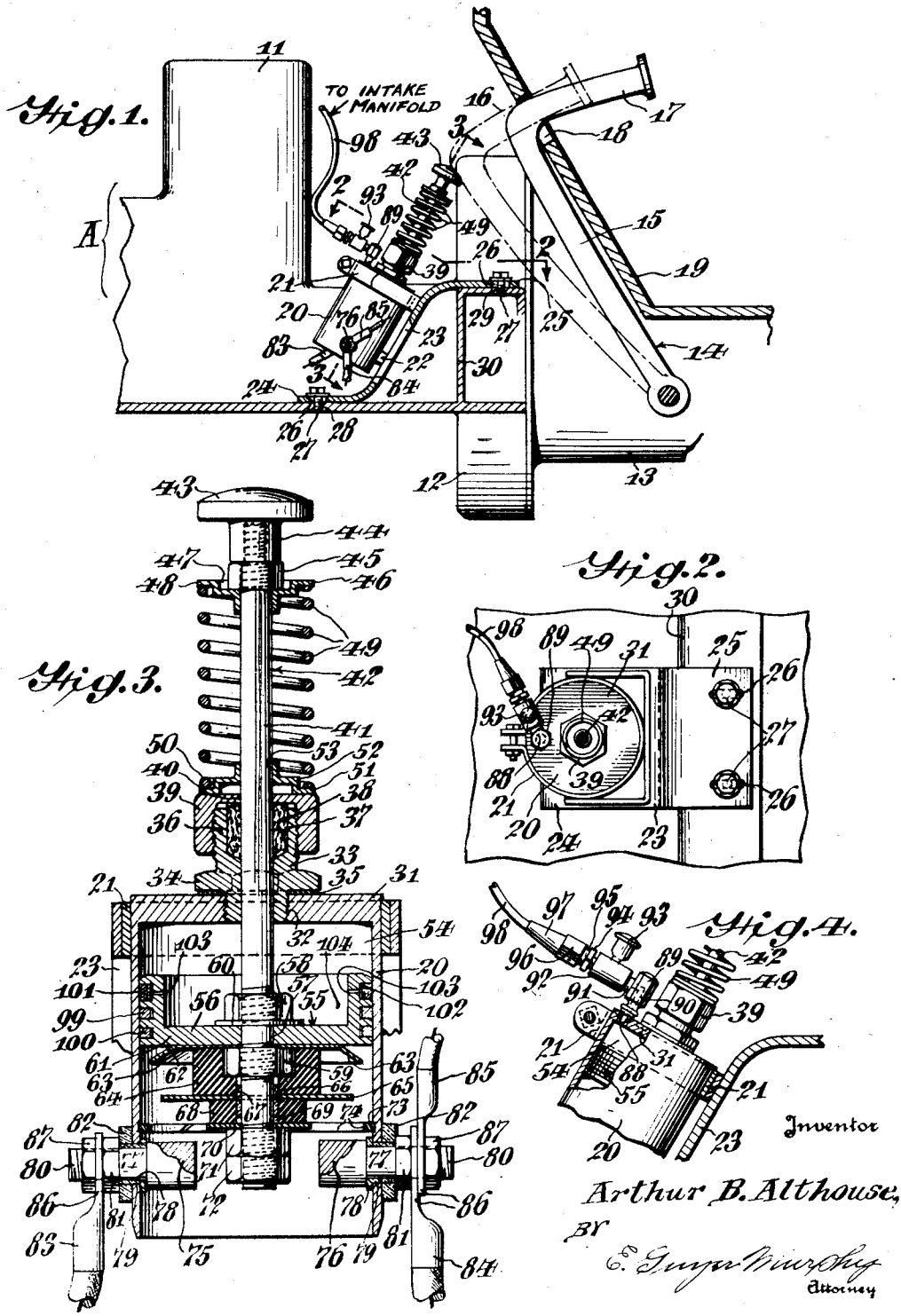

1,902,940

UNITED STATES PATENT OFFICE

ARTHUR B. ALTHOUSE, OF DREXEL HILL, PENNSYLVANIA

VACUUM CONTROLLED SWITCH FOR STARTING MOTORS

Application filed March 17, 1931. Serial No. 523,221.

This invention in general relates to starting devices for vehicles, and more particularly to a vacuum-controlled switch for starting motors of self propelled vehicles.

The principal object of the invention is to provide a novel, highly efficient, vacuum-controlled switch for starting motors, of comparatively simple and inexpensive construction, and particularly designed and adapted to be attached to any conventional type of automotive vehicle without reorganization or alteration thereof.

Another object is to provide a compact self starter switch for the starting motors of vehicle engines which will not only eliminate the necessity for a separate starter pedal but will also prevent the accidental or unintended operation of the starter motor while the engine of the vehicle is running.

A further object is to provide in a self propelled vehicle a clutch-pedal-operated starter switch with vacuum controlled means for automatically and mechanically moving the clutch pedal after operation sufficiently to break the electric circuit through the said switch to the starter motor, thereby deenergizing the latter and preventing further or accidental operation thereof while the engine is running.

Additional objects and advantages of the method and means employed will appear more fully in the details hereinafter set forth, reference being had to the accompanying drawing, in which Figure 1 is a side elevational view of an embodiment of my invention operatively secured by a bracket shown in section, to adjacent portions of the clutch and engine base, illustrated partly in elevation and partly in section, with other parts broken away;

Figure 2 is a transverse sectional view, taken on line 2—2 of Figure 1, with adjacent parts of the motor and associated mechanism broken away;

Figure 3 is an enlarged vertical sectional view of my invention taken on line 3—3 of Figure 1, and Figure 4 is a fragmentary side elevational view, partly in section, with parts broken away to more clearly show certain details thereof.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawing wherein similar characters of reference indicate corresponding parts in the preferred form of the invention, A designates a conventional automobile power plant having the usual engine block 11 to which is connected a clutch housing 12 joined by a transmission case 13. Pivotally mounted on the transmission case 13, in any suitable manner, is the clutch operating pedal 14, the shank 15 of which is provided with the usual elbow 16 and bent portion 17 which latter extends through a hole 18 in the flooring 19 of the automobile (not shown).

The above details are typical of automobiles and the power plants thereof, and form no part of the present invention.

My invention comprises a casing 20 that may be fastened, as by the bolt and nut adjusted clamp 21 and lug 22 to a bracket 23, formed of a flat metal strip, the oppositely extended ends 24, 25 of which are provided with slots 26 accommodating bolts 27, the latter being threadedly secured in holes 28, 29 formed in an extending portion of the engine block 11, and in a section 30 of the clutch housing 12.

As best shown in Figure 3, the casing 20 is open at the lower end, and at the upper end is provided with a top 31 formed with a hole 32 in which is threaded a packing or stuffing box nut 33 having a laterally extended flange 34 which engages the gasket 35 seated on the outer surface of the top 31 of the casing 20.

It will be observed, by inspection of Figure 3, that an upwardly projecting portion 36 of the packing nut 33 is formed with a pocket 37 which receives packing material 38. A gland nut or follower 39 having a hole 40 through which is passed the stem 41 of a plunger operating rod 42 is threadedly engaged on the portion 36 of the packing nut 33. On the upper end of the rod 42 is threadedly secured a foot engaged operating button 43 having a hollow depending shank 44 with which is formed integrally a nut 45. A sleeve 46 slidably receiving the stem 41 of the plunger operating rod 42, is provided with a shallow pocket or recess 47 in which the nut 45 of the operating button 43 is seated, the sleeve 46 being also formed with an annular projecting flange 48 against the under surface of which a coil spring 49 is engaged. The lower end 50 of the coil spring 49 is seated on an annular projecting flange 51 formed on a second sleeve 52 also provided with a hole 53 for the slidable reception of the stem 41 of the plunger operating rod 42.

It will be observed that the packing nut 33 together with the packing 38 and the gland nut 39 form a packing gland providing a substantially air tight seal for the inner chamber 54 of the casing 20, which receives a plunger assembly 55 mounted on the lower portion of the stem 41, and hereinafter described.

As clearly shown in Figure 3, a piston 56 having a hole 57 is adjustably secured on the stem 41 by nuts 58, 59, the nut 58 being seated against a washer 60 directly resting against the inner surface of the floor or inverted head 61 of the piston 56, while nut 59 clampingly engages a dish-shaped plate 62 having an angular deflecting projection or baffle 63 for a purpose which will now appear.

Against the under surface of the plate 62 a flexible shock-absorbing element or sleeve 64 is engaged. Against the element 64 which may be of rubber, a metal disc 65 having a hole 66, receiving the stem 41, is placed, it being noted that a small sleeve or cylindrical section of insulating material 67 mounted on the stem 41 insulates the latter from the disc 65. A cushioning washer or element 68 of any suitable material having a hole 69 accommodating the above-mentioned cylindrical section of insulating material 67 is mounted on the stem 41 and confined between a metal washer 70 and the metal disc 65. The washer 70 is engaged by a nut 71 threadedly engaged on the lower end of the stem 41, a lock nut 72 securing the nut 71 on the stem 41.

In an inner circumferential groove 73 formed in the inner wall of the casing 20, a split oil retaining ring 74 is engaged, the purpose of the latter being to prevent excess oil from fouling the surface of the metal contact members 75, 76, which are provided with reduced portions 77 received in insulating bushings 78 which protrude through the holes 79, in the walls of the casing 20. The annular deflecting projection 63 also serves a similar purpose in preventing oil from falling directly on the contact members 75, 76.

It will be further seen that the exteriorly projecting threaded ends 80 of the contact members 75, 76 are engaged by nuts 81 clampingly securing the contact members 75, 76 in the operative position shown in Figure 3, while insulating washers 82 on the projecting ends of the bushings 78 are confined between the exterior surface of the casing 20, and the nuts 81.

Cables 83, 84, 85 having apertured metal ends 86 are clampingly mounted on the ends of the contact elements 75, 76 by lock nuts 87. The cable 83 is connected to an insulated contact of the starting motor (not shown), the other circuit completing contact of which is grounded to one pole of the battery (not shown), while the cable 84 is connected to the other pole of the same battery (not shown). The third cable 85 is electrically connected with the ignition mechanism of the automobile (not shown).

As best shown in Figure 4, it will be seen that in the top 31 of the casing 20, a hole 88 is provided in which a hollow plug 89 having a fluid-conducting channel 90 is threadedly secured. Fastened on a laterally projecting tubular extension 91 of the plug 89 is a sleeve joint 92 having an oil cup 93. To the sleeve joint 92 a flanged pipe coupling element 94 having a threaded end 95 is fastened. A coupling nut 96 revolvably confined on a socket joint 97 secured to a pipe 98 communicating with the intake manifold (not shown) of the power plant A serves, when engaged on the end 95, to effect a fluid tight connection between the pipe 98 and the inner chamber 54 of the casing 20 for a purpose described hereinafter.

As shown in Figure 3, I have provided the piston 56 with piston rings 99, 100, and a separate lubricating ring 101 formed of suitable absorbing fibrous material, this ring 101 being secured in a groove 102 which communicates with a duct 103 leading to the interior of the chamber 54. Sufficient oil may be poured through the oil cup 93 to partially fill the well 104 of the piston 56 to a point where the oil will seep the duct 103 and moisten the lubricating ring 101. One filling of oil will serve to lubricate the coacting surfaces of the piston and the wall of the chamber 54 for efficient operation over a long period of time. The operation of the device briefly is as follows:—

Assuming it is desired to start the power plant A into operation, the driver of the vehicle will first depress the clutch pedal 14 until the elbow 16 descends to the position shown in dotted lines on Figure 1, this, of course, serving to release the clutch. A slight further descent of the clutch lever 14 of approximately half an inch will cause the elbow 16 to thrust downwardly the plunger operating rod 42 against the resistance of the coil spring 49, thereby moving the metal disc 65 through the oil retaining ring member 74, until the two metal contact elements 75, 76 are engaged in this manner permitting current from the source of electric energy (not shown) to pass from one cable 83 to the other cable 84, thus completing the circuit to the starting electric motor (not shown) and consequently causing the firing of the engine 11 in the usual manner.

As soon as the engine 11 starts into operation, the vacuum created in the intake manifold exhausts the air from the upper portion of the chamber 54 of the casing 20, causing the thrusting upwardly of the piston 56 by atmospheric pressure against the exterior surface of the inverted head 61 of the piston 56, in the usual manner. The ascent of the piston 56 which moves upwardly about half an inch carrying with it the plunger operating rod 42, button 43 and metal disc 65, will break the electric circuit completed by the said disc 65 between the contacts 75, 76, thereby deenergizing the starting motor and simultaneously engaging the button 43 with the elbow 16 of the clutch pedal 14 which will cause the forcible pushing back of the said clutch pedal a fraction of an inch and will prevent, while the engine 11 is running, the accidental or unintended operation of the starting motor while the engine is functioning. When the clutch pedal is thus forcibly thrust back, as described above, the foot of the driver, if resting on the button 43, will likewise be thrust back, gently but forcibly, about half an inch, the clutch (not shown) of course, meanwhile being released until the driver of the vehicle withdraws his foot voluntarily to allow the clutch to perform its normal operating functions in transmitting torque to the driving mechanism of the vehicle.

Among the advantages accruing from the present combination it may be pointed out that inexperienced operators cannot injure the self starting mechanism, as is possible with conventional types of apparatus which employ a separate pedal or button therefor since not only is the separate self starter pedal eliminated, hitherto a prolific source of costly oversights on the part of new and unskillful drivers who frequently mistake the self starter pedal or button for the accelerator button, as is well known, but the clutch itself is of necessity withdrawn out of engagement with the flywheel of the engine before the latter is energized, thus preventing the accidental movement of the vehicle through the medium of the self starting motor alone. While the engine of the vehicle is running it will be impossible to operate the self-starter, but the clutch, of course, may be released in the usual manner by pushing the clutch pedal down with the foot. In this respect, my device is practically "foolproof" since it can be operated only when there is no vacuum in the chamber 54; i. e. when the engine 11 is not running.

The present device, it will be observed by inspection of the drawing, is of a remarkably simple and rugged construction while the electric circuit completing elements are likewise of a sturdy rugged character and practically proof against burning out,—a common defect in delicately organized conventional circuit making and breaking apparatus employed on many present day automobiles. The entire apparatus which is very compact, may actually be operatively secured to many types of automobiles by an ordinary pipe or hose clamp, and in certain others, a bracket or plate may be employed for attachment to any suitable adjacent part of the mechanism of a vehicle or craft. In the present instance, I have shown how a pipe clamp and a bracket may both be used for securing the device to the power plant of an automobile.

It may be pointed out that the operator of a vehicle equipped with my device is immediately and positively apprised of the starting of the engine of the car as the clutch pedal rises and forcibly pushes back his foot a half inch or so indicating that a vacuum has been created in the intake manifold by the running of the engine. So far as I am aware, this feature in itself is present in no other make of starter control. As long as the engine is running, the starter switch will oppose a resistance too great to be overcome by any normal pressure of the foot on the clutch pedal after the latter has first released the clutch and then descended to a point where it engages the operating button 43.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. An automobile starter switch of the kind described comprising, a casing, a piston slidably mounted in said casing, a rod secured to the piston, and a circuit-completing member secured to said rod and arranged between shock-absorbing material fastened to the rod, said circuit-completing member being coactingly engageable with contact members secured to the casing for completing an electric circuit.

2. An automobile starter switch of the kind described comprising, a casing, a piston secured to a rod resiliently mounted on said casing, a circuit-completing member fastened to the rod, shock-absorbing material secured to the rod and arranged on either side of the circuit-completing member, and a pair of contact members insulatively secured to the casing, said contact members being engaged by said circuit-completing member when said rod is actuated.

3. An automobile starter switch of the kind described comprising, a casing, a piston reciprocatingly secured within the casing, a rod fastened to the piston, a circuit-completing member secured to the rod between shock-absorbing material arranged thereon, a pair of contacts insulatively secured to the casing, said contacts being bridged by said circuit completing member when the rod is depressed, and resilient means to maintain said piston in the upper part of the casing and consequently the circuit-completing member out of contact with the pair of contacts until said rod is actuated.

4. An automobile starter switch of the kind described comprising, a casing, a piston slidably secured within the casing and resiliently maintained in the upper portion thereof, an opening in the said upper portion of the casing for exhausting air therefrom, a rod secured to the piston, insulating means fastened to the rod, a metal disc having a hole receiving said insulating means, said metal disc being arranged on the rod and clampingly engaged between shock-absorbing material secured thereto, and a pair of contacts insulatively secured to the casing, said pair of contacts being bridged by said disc when the rod is depressed.

ARTHUR B. ALTHOUSE.